(12) United States Patent
Richards

(10) Patent No.: US 11,109,003 B2
(45) Date of Patent: Aug. 31, 2021

(54) DIGITAL POINT SPREAD FUNCTION (DPSF) AND DUAL MODULATION PROJECTION (INCLUDING LASERS) USING DPSF

(71) Applicant: Dolby Laboratories Licensing Corporation, San Francisco, CA (US)

(72) Inventor: Martin J. Richards, Gig Harbor, DC (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/247,865

(22) Filed: Jan. 15, 2019

(65) Prior Publication Data

US 2019/0149784 A1 May 16, 2019

Related U.S. Application Data

(62) Division of application No. 14/266,240, filed on Apr. 30, 2014, now Pat. No. 10,237,523.

(60) Provisional application No. 61/820,683, filed on May 7, 2013.

(51) Int. Cl.
*H04N 9/31* (2006.01)

(52) U.S. Cl.
CPC ......... *H04N 9/3161* (2013.01); *H04N 9/3129* (2013.01)

(58) Field of Classification Search
CPC ... H04N 9/3126; H04N 9/3129; H04N 9/3161
See application file for complete search history.

(56) References Cited

U.S. PATENT DOCUMENTS

| 5,497,172 | A  | 3/1996  | Doherty   |
|-----------|----|---------|-----------|
| 5,969,710 | A  | 10/1999 | Doherty   |
| 6,285,491 | B1 | 9/2001  | Marshall  |
| 6,285,799 | B1 | 9/2001  | Dance     |
| 7,002,533 | B2 | 2/2006  | Sayag     |
| 7,064,740 | B2 | 6/2006  | Daly      |
| 7,403,332 | B2 | 7/2008  | Whitehead |
| 7,973,781 | B2 | 7/2011  | Nitta     |
| 8,035,604 | B2 | 10/2011 | Seetzen   |
| 8,134,591 | B2 | 3/2012  | Marcus    |
| 8,174,546 | B2 | 5/2012  | Whitehead |
| 8,223,141 | B2 | 7/2012  | Ng        |

(Continued)

FOREIGN PATENT DOCUMENTS

EP 0696128 2/1996

OTHER PUBLICATIONS

Seetzen, Helge "High Dynamic Range Display and Projection Systems" University of British Columbia, 2009.*

(Continued)

*Primary Examiner* — Mohammed S Rahaman

(57) ABSTRACT

A digital PSF for use in a dual modulation display. The invention allows the use of less than optimal point spread (PSF) functions in the optics between the pre-modulator and primary modulator of a dual modulation projection system. This technique uses multiple halftones per frame in the pre-modulator synchronized with a modified bit sequence in the primary modulator to produce a compensation image that reduces the errors produced by the sub-optimal PSF. The invention includes the application to dual modulation and dual modulated 3D viewing systems.

13 Claims, 2 Drawing Sheets

(56) References Cited

U.S. PATENT DOCUMENTS

| | | |
|---|---|---|
| 8,330,770 B2 | 12/2012 | Rehman |
| 2003/0063226 A1* | 4/2003 | Gibbon ................ G02B 27/143 |
| | | 348/771 |
| 2005/0041000 A1 | 2/2005 | Plut |
| 2007/0003155 A1 | 1/2007 | Miller |
| 2009/0040398 A1 | 2/2009 | Kasahara |
| 2009/0153752 A1* | 6/2009 | Silverstein ......... G02B 27/1026 |
| | | 348/750 |
| 2009/0295706 A1* | 12/2009 | Feng ...................... G09G 3/342 |
| | | 345/102 |
| 2011/0025725 A1* | 2/2011 | Hulze .................. G09G 3/3426 |
| | | 345/690 |
| 2011/0279749 A1* | 11/2011 | Erinjippurath ....... H04N 13/351 |
| | | 349/61 |
| 2012/0224121 A1* | 9/2012 | Gilbert ................ H04N 13/337 |
| | | 349/64 |
| 2013/0063496 A1 | 3/2013 | Basler |

OTHER PUBLICATIONS

Kusakabe, Y et al. "A High-Dynamic Range and High-Resolution Projector with Dual Modulation" Jan. 18, 2009, Proc. SPIE, Color Imaging.

* cited by examiner

DIGITAL POINT SPREAD FUNCTION (DPSF) AND DUAL MODULATION PROJECTION (INCLUDING LASERS) USING DPSF

CROSS REFERENCE TO RELATED APPLICATIONS

This application is a divisional of U.S. patent application Ser. No. 14/266,240 filed on Apr. 20, 2014, which claims benefit of priority of U.S. Provisional Patent Application No. 61/820,683 filed on May 7, 2013 entitled "Digital Point Spread Function (DPSF) and Dual Modulation Projection (including Lasers) using DPSF"; wherein the disclosure of reference is incorporated herein by reference in its entirety.

BACKGROUND OF THE INVENTION

Field of Invention

The present invention relates to display devices and more particularly to dual modulation projectors (including laser projectors) and the creation and use of a point spread function between modulators.

Discussion of Background

Dual modulation projectors and displays include display devices (e.g., Whitehead U.S. Pat. No. 7,403,332, and Daly U.S. Pat. No. 7,064,740) and projectors (e.g., Sayag U.S. Pat. No. 7,002,533).

SUMMARY OF THE INVENTION

The present inventor has realized the need to increase contrast and brightness of projection displays and to reduce artifacts. The present invention includes generation of a digital PSF. The digital PSF may be, for example, a digital PSF of a modulated light source to illuminate a modulator of a projector or other display. The illuminated modulator may be, for example, a primary (or final) modulator of a dual modulation projection system, an intermediary modulator of a multi-modulation system, or, alternatively, any other modulator within a projection or display system.

The digital PSF provides, for example, a PSF of any of a pixel, tile, or other area of a pre-modulator image or other lighting illuminating the primary (or other) modulator that is configurable to account for variations, discontinuities, abberations, or other non-uniformities in a light path between the pre-modulator and primary modulator such that a uniform PSF is exhibited at the primary modulator. The digital PSF may be utilized to assure a consistent PSF among all pixels (or any group of pixels) in an image, image path, or as illuminated on the primary modulator.

In one embodiment, the present invention provides a dual modulation projector containing a pre modulator, relay optics, and a primary modulator, and where pre-compensation for imperfections of the relay optics PSF is made by modifying the image sent to the pre modulator (pre-modulator image). The result is a desired uniformity and/or shape of the light illuminating the primary modulator.

The desired uniformity and/or shape of the light illuminating the primary modulator may be different for different portions of the image. The pre-compensation may be a filter that is different for different regions of the image. The resulting PSF of pixels of the light illuminating the primary modulator may be flatter in areas of the image having predominately lower spatial frequencies, and the resulting PSF of pixels of the light illuminating the primary modulator may be sharper in areas of the image having predominately higher spatial frequencies. The PSFs may be different based on wavelengths of light being modulated. In one embodiment, all PSFs in a region of the image have similarly shaped PSFs when illuminating a corresponding area of the primary modulator. The shapes of the same lights may be different before transfer optics or other optical elements in the light path between modulators, the differences being pre-compensation that adjusts the light to account for how the different lights change en-route to the primary modulator. Ideally, the compensation is different for each wavelength of light which reacts differently to different optical elements within the light path.

The pre-compensation filter may include coefficients are calculated based upon PSF measurements and a reference desired PSF.

Additional compensation is made by the primary modulator. The additional compensation includes, for example, compensation to further modulate the light illuminating the primary modulator into the desired image. The additional compensation may also include compensation for a PSF of one or more pixels.

The pre-modulator may be, for example, a DMD "displaying" a halftone image. The primary modulator may also be a DMD. The invention may be implemented on combinations of reflective and transmissive modulators with any of polarizers, reflectors, dichroics, PBSs, or other optical elements as relay optics between the modulators. The pre-modulator itself may be illuminated by any combination of broadband light sources, narrowband light sources, modulated light sources. Preferably, the pre-modulator is illuminated by a laser light source that is at least globally dimmed and may include some form of local dimming (or spatial modulation) to further increase contrast.

The invention includes a half-tone or other image on a pre-modulator that is changed multiple times per frame, and where bit sequences that energize the pre-modulator for each of those multiple times per frame are synchronized with corresponding energization signals of the primary modulator. The invention includes a pre-modulator DMD energized with a halftone image and a primary modulator DMD. The pre-modulator's half-tone image is changed multiple times per frame, and where the bit sequences on the pre-modulator DMD the primary modulator DMD are synchronized, such that an average across the frame is the product of an average of the pre-modulator images through the relay optics and the primary modulator image. In various embodiments, the pre-modulator half tone image is changed any of twice, three times, four times, and eight times or more per frame. The number of times per frame that the pre-modulator image may change may be variable, such that, for example, for some frames the pre-modulator image is changed twice per frame, and for other frames it is changed 4 times per frame. The number of pre-modulator half-tone changes may be updated when transitioning between 2D and 3D projection modes or transitioning between single and dual projector modes, or utilizing additional projectors. The number of halftone changes may be changed when transitioning between different environments. The number of half tone changes may be different for different projectors and/or similar projectors in different environments, for example when displaying cinema content to riders in a theme park ride as they transition from scene to scene in different portions of the ride that may utilize different projectors or a plurality of similar projectors in different environments.

The DMDs are synchronized such that the average across the frame is the product of the average of the pre-modulator images through the relay optics and the primary modulator image.

In one embodiment, the pre-modulator half-tone image is changed three or more times per frame and in synchronization with the final modulator image that is changed at least once per frame.

1) The present invention includes a method of energizing a pre-modulator, comprising the steps of: Obtaining a 2D PSF of relay optics or other non-uniformities in a light path between the pre-modulator and a primary modulator;
2) Calculating a correction factor comprising difference between a desired PSF and the 2D PSF;
3) Applying the correction factor to a pre-modulator image; and
4) Energizing the pre-modulator with the corrected pre-modulator image.

The invention allows the use of less than optimal point spread (PSF) functions in the optics between the pre-modulator and primary modulator of a dual modulation projection system. This technique uses multiple halftones per frame in the premodulator synchronized with a modified bit sequence in the primary modulator to produce a compensation image that reduces the errors produced by the sub-optimal PSF.

Portions of the invention may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts (satellite, Wi-Fi, WI-Max, etc.), and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The current dual modulation POC EDR projector uses a single half tone image per frame on the pre-modulator. A problem arises when the PSF of the relay optics between the two modulators is sub optimal, especially when the resultant PSF is multi-lobed, or non-monotonic in any direction. In order to compensate for sub-optimal PSFs with a single halftone image, the compensation is performed in the primary modulator. This can be done if the PSFs are reasonably well controlled across the frame and with the use of multiple PSFs within the dual modulation algorithm, and interpolation between PSFs across the frame. Ultimately, one could use a different PSF for every pixel within the frame, but this would create additional computation burden. In addition, the registration between the two modulators should be precise, and there are some limitations due to the limited contrast ratio of the primary modulator. Also, measurement or alignment errors may show up as high spatial frequency errors in the final image.

Figure 1:
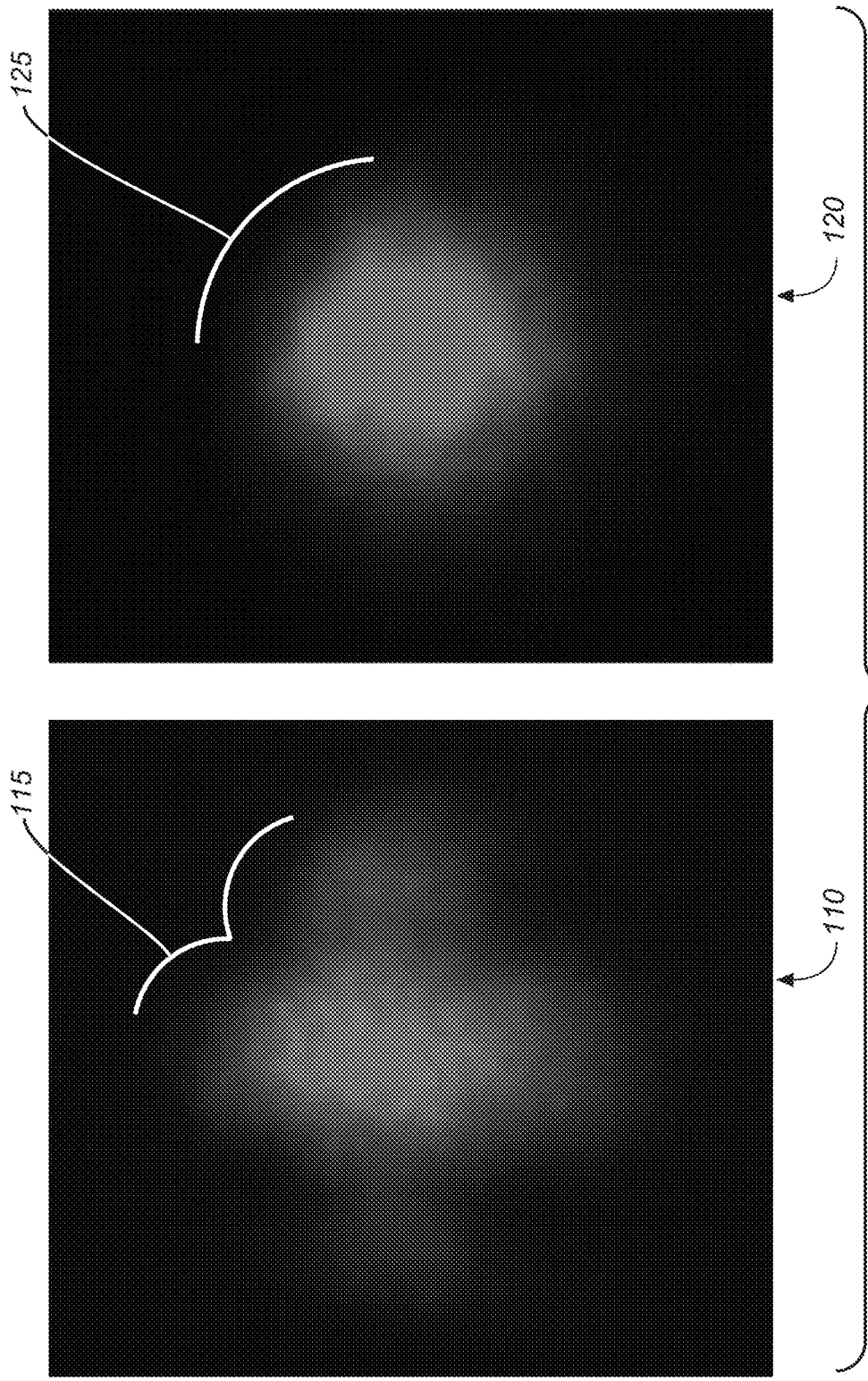
FIG. 1 is an illustration of an example PSF and a corrected PSF.

FIG. 1 provides examples of PSFs from the relay optics. The left PSF 110 is sub-optimal, while the right PSF 120 is desirable. As can be seen in FIG. 1, sub-optimal PSF 110 includes a less predictable clover-leaf like pattern 115, and desirable PSF 125 is rounded and fades in a more consistent or controlled/predictable manner.

It would be better if the apparent PSF at the primary modulator was well controlled. One way of obtaining this is to average over several PSFs. As a practical matter, a single pixel turned on in the halftone image of the pre-modulator produces a small enough point to produce a point spread function on the primary modulator; thus the PSF can be measured on the projected image by turning the primary modulator to all white in the presence of single 'on' pixels in the pre-modulator.

Normally, in a dual modulation system we are rarely if ever turning on a single pixel in the pre-modulator, therefore multiple PSFs are typically present. If the PSFs are significantly larger than the tile size (which limits the highest spatial frequency that can be obtained) of the halftone image, one can obtain a PSF correction for the pre-modulator image which is used to generate the halftone image. The process may be implemented as:

1. Obtain 2D PSF of relay optics and its 2D Fourier Transform. rpsf(x,y), RPSF(wx,wy).
2. Specify desired PSF dpsf(x,y), DPSF(wx,wy).
3. Calculate the correction factor $Zc(x,y)(wx,wy)=DPSF(wx,wy)/RPSF(wx,wy)$ for a large number of regions in the image, and interpolate to obtain a smoothly changing Zc as a function of x,y. Obtain inverse Fourier Transform of $Zc(x,y)(wx,wy)=zc(x,y)(x,y)$.
4. Apply Zc to each region of the premod image. This might be best done in the location domain as Corrected Image CI=zc convolved with the premod image.

These calculations determine a correction factor that filters the premodulator image in such a way that when combined with the PSF of the optics an image is produced where the inconsistencies of the optics PSF is smoothed to the desired psf. Of course, this only works if the relay optics PSFs are larger than the smallest feature that can be obtained from a halftone conversion of the premod image. This last point is important, as it limits the application of this approach to requiring large relay optics PSFs.

Addressing the halftone feature limitation requires an approach similar to that described in co-pending U.S. Patent Publication 2014/0333835. In this implementation, instead of increasing the number of levels for the halftone image, we could use the same technique to decrease the size of the halftone tiles, so that the feature size was reduced.

As an example, let us assume that we originally had a 4×4 tile (16 levels), and we now divide the picture frame into 4 sub-frames. The tile size can now be reduced to 2×2 and still obtain 16 levels. The feature resolution in the halftone image has doubled, allowing smaller relay optics PSFs to be compensated.

The amount of effort to compensate for the PSFs has not reduced from the original design where all of the correction was done in the primary modulator, however, this approach reduces the visibility of errors caused by misalignment and measurement error verses the original approach using the primary modulator. These errors are translated into low frequency type errors which have lower visibility.

As described in co-pending U.S. Patent Publication 2014/0333835, if a DMD (TI Digital Mirror Device) is used for the primary modulator, modification of the bit sequences for the modulation chips will be required. The DMD uses a form of pulse width modulation to modulate the light; therefore, the light is required to be constant during the entire frame period. Changing the pre-mod halftones during the frame (4 times) would produce a non-constant light, and interfere with the PWM result.

Normally the DMD is used with a single sequence per frame to obtain a 16 bit per pixel modulation. It is proposed to modify the bit sequence so that the higher order bits are spread across the frame period; therefore, they are repeated multiple times. For example, if the top 14 bits (of 16) are repeated, this would allow a pattern with the top 14 bits repeated 4 times. The lower significant bits would remain unaffected, (spread across the entire frame period). This type of repeated sequencing has been described in the literature and is used to reduce motion artifacts with DMD based projection systems. U.S. Pat. No. 5,986,640 describes a similar technique. The halftone image on the pre-modulator would be synchronized with the repeated sequences in the primary modulator such that both modulators would change to a new sequence at the same time.

Figure 2:
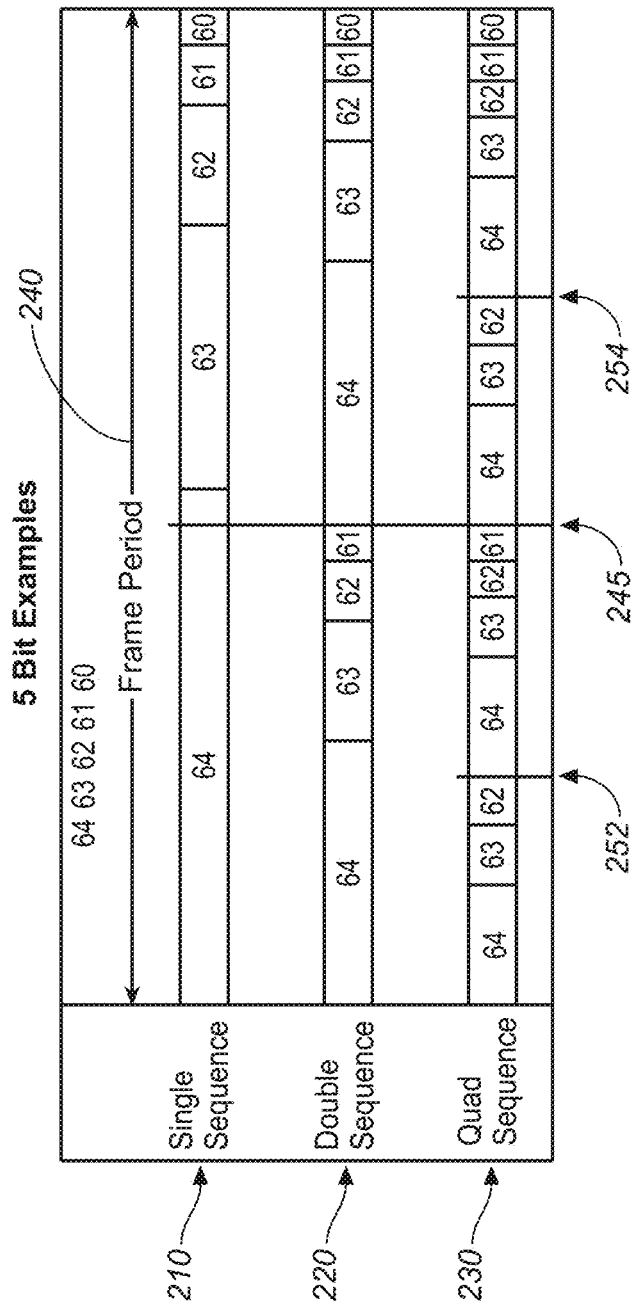
FIG. 2 is a diagram of an example bit sequence.

A proposed sequence that could operate under the requirements of the present invention is illustrated in FIG. 2.

The single sequence illustrates a standard half-tone only modulator sequence for a single frame. The double sequence illustrates the single sequence divided into two partitions for the frame. The quad sequence illustrates the single sequence divided into four partitions for the frame. More specifically, as shown in FIG. 2, the proposed sequence provides an example single sequence 210 illustration for a half-tone only modulator sequence for a single frame (e.g., frame period 240). A double sequence 229 illustrates the single sequence divided into two partitions for the frame. A quad sequence 230 illustrates the single sequence divided into four partitions for the frame (partitions divided at 252, 245, and 254, for example).

The divided sequences are, for example, provided different bit sequences representing different half-tone images applied to the same frame (and, for example, the same primary modulator image). The divided sequences may alternate between a first and second half-tone image. The divided sequences may implement a rotating sequential application of first, second, and third half-tone images for each frame. The half-tone images implemented for each frame include, for example, compensation of relay optics or other variations as described above. Based on the above disclosure, many other sequences may be developed, customized, synchronized or chained together to perform the same result, any one or more of which may be implemented together or separately in conjunction with any other aspect (or aspects) of the present invention.

The pre-modulator is preferably illuminated by laser light sources and the compensation of the pre-modulator image preferably compensates for wavelength specific aspects of the relay optics. Preferably, the result is a PSF of each pixel (or groups of pixels) for each of the half-tone images that are similarly shaped and varying smoothly from one-pixel to the next. The shapes of the PSFs in groups of pixels in regions of the image being modulated are the same or similar and any differences between PSFs of neighboring regions may, preferably, smoothly transition from the first region's preferred PSF to the adjoining region's preferred PSF. For 3D projections, the pre-modulator image is compensated to account for wavelength differences and associated wavelength dependent PSF changes between different colors (or different wavelengths) of the same or different viewing channels (e.g., left and/or right eye viewing channels), and/or similar differences/changes in the same colors (different wavelengths) of different or same viewing channels.

In various embodiments, the present invention may be a dual modulation projector containing a pre modulator, relay optics, and a primary modulator, and where pre-compensation for imperfections of the relay optics PSF is made by modifying the image sent to the pre modulator. The pre-compensation filter is different for different regions of the image. The pre-compensation filter coefficients may be calculated based upon PSF measurements and a reference desired PSF. Additional compensation is made in the primary modulator. The pre-modulator image may be a halftone image on a DMD, and the primary modulator may be a DMD. The halftone image may be changed multiple times per frame, and where the bit sequences on the pre-modulator DMD and primary modulator DMD are synchronized, such that the average across the frame is the product of the average of the pre-modulator images through the relay optics and the primary modulator image.

The present invention may comprise a projector comprising a pre-modulator to modulate light into a first image, a primary modulator configured to further modulate the light to produce a desired image, and relay optics configured to transfer the modulated light of the first image to the primary modulator, wherein the transfer optics are further configured to spread pixels of the first image so that each pixel of the first image illuminates a plurality of pixels of the primary modulator. The invention may further comprise a controller configured to energize the first modulator with a backlight image based on image data of the desired image, the backlight image further comprising an adjustment of pixels of the backlight image to compensate for non-uniformity on the primary modulator of one or more of the first image pixels. The compensation may comprise a difference between a desired point spread function of light transferred from the pre-modulator to the primary modulator and a PSF and/or MTF of the relay optics. The backlight (or pre-modulator) image comprises a convolution of a low resolution version of the desired image and the difference. The compensation may comprise a compensation scheme selected from a plurality of compensation schemes based on the desired image. The compensation may comprise a non-linear equation adjusted based on the desired image. The compensation may comprise a compensation scheme selected or derived based on a spatial frequency parameter of the image and a wavelength of light being modulated. The compensation may comprise one or a combination of a plurality of compensation schemes applied to different portions of the backlight image.

A projector according to the invention may comprise a multi-color channel projector each channel comprising a similar configuration of a pre-modulator, primary modulator, and transfer optics, said controller energizing each pre-modulator with image data comprising a backlight image for each color channel along with a color specific compensation. The compensation may comprise an inverse of a non-uniformity of spreading of pixels of the pre-modulator onto multiple pixels of the primary modulator according to wavelengths of light modulated in each channel. The first modulator may comprise one of a transmissive modulator and a reflective modulator, and the primary modulator comprises one of a transmissive modulator and a reflective modulator, and the first modulator and second modulator are not necessarily the same type of modulator.

Projectors according to the present invention may comprise modulators of different types or the pre-modulator and primary modulators are both DMD modulators. The pre-modulator and primary modulators may be Liquid-Crystal-on-Silicon (LCoS) modulators. Any of the projectors may be configured for projecting 3D images such as wherein the pre-modulator images comprise 1st and 2nd channel images of a 3D image, and the pre-modulator may be energized by compensated pre-modulator images comprising left and right images of a 3D image, and wherein the projector is part of a system for displaying an viewing 3D images comprising glasses comprising filters corresponding to the left and right images comprising filter passbands encompassing wavelengths of the left and right images.

In the 3D embodiments, the wavelengths of the left image may originate, for example, from a laser light source illuminating a pre-modulator while being energized with a compensated pre-modulator left image corresponding the illuminating wavelengths in a left image time frame; wavelengths of the right image originate from a laser light source illuminating the pre-modulator while being energized with a compensated pre-modulator right image corresponding to the illuminating wavelengths in a right image time frame.

The projectors of the present invention in multi-view and/or 3D embodiments may be, for example, part of a system for displaying and viewing 3D images and the modulated desired images are passed via wavelength selective filters in 3D viewing glasses such that modulated wavelengths of the left images of the 3D images are passed by a left filter of the 3D viewing glasses and modulated wavelengths of the right images of the 3D images are passed by a right filter of the 3D viewing glasses and the filters comprise passbands that are offset relative to the wavelengths being viewed through the passbands such that wavelengths of the compensated half-tone images further modulated into desired left and right images by the primary modulator are passed via passbands that encompass and are shifted toward longer wavelengths compared to the wavelengths of the intended image wavelengths passed through the passbands. Such arrangement allow for capturing laser wavelengths part of compensated half-tone images further modulated for viewing at oblique angles.

Although the present invention has been described herein with reference to DMDs and dual modulation systems, the devices and processes of the present invention may be applied to other modulation types and multi-modulation architectures.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing a lens, modulators, relay optics, etc., any other equivalent device, or other device having an equivalent function or capability, whether or not listed herein, may be substituted therewith. Furthermore, the inventors recognize that newly developed technologies not now known may also be substituted for the described parts and still not depart from the scope of the present invention. All other described items, including, but not limited to modulators, projectors, data processing, etc should also be considered in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, calculating PSFs, adjusting PSFs by any of addition, subtraction, multiplication, and convolution; energizing modulators with half-tone data and synchronizing half-tome data as energized with energizations of other modulators in a same optical path, and the display, storage, or communication of results according to the processes of the present invention.

The present invention may suitably comprise, consist of, or consist essentially of, any of element (the various parts or features of the invention and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A projector comprising:
   a pre-modulator configured to modulate light into a first image;
   a primary modulator configured to further modulate the light to produce a desired image;

one or more relay optics configured to transfer the modulated light of the first image to the primary modulator, wherein the transfer optics are further configured to spread pixels of the first image so that each pixel of the first image illuminates a plurality of pixels of the primary modulator; and a controller configured to energize the pre-modulator with a backlight image based on image data of the desired image, the backlight image further comprising an adjustment of pixels of the backlight image to compensate for imperfections of the relay optics;

wherein the compensation comprises a difference between a desired point spread function (PSF) of light transferred from the pre-modulator to the primary modulator and a PSF of the relay optics.

2. The projector according to claim 1, wherein the backlight image comprises a convolution of a low-resolution version of the desired image and the difference.

3. The projector according to claim 1, wherein the compensation comprises a compensation scheme selected from a plurality of compensation schemes based on the desired image.

4. The projector according to claim 1, wherein the compensation comprises a non-linear equation application adjusted based on the desired image.

5. The projector according to claim 1, wherein the compensation comprises a compensation scheme selected or derived based on a spatial frequency parameter of the image and a wavelength of light being modulated.

6. The projector according to claim 1, wherein the compensation comprises a plurality of compensation schemes applied to different portions of the backlight image.

7. The projector according to claim 1, wherein the projector comprises a multi-color channel projector each channel comprising a similar configuration of a pre-modulator, primary modulator, and relay optics, and said controller energizing each pre-modulator with image data comprising a backlight image of each color channel along with a color specific compensation.

8. The projector according to claim 7, wherein the compensation comprises an inverse of a non-uniformity of spreading of pixels of the pre-modulator onto multiple pixels of the primary modulator according to wavelengths of light modulated in each channel.

9. The projector according to claim 6, wherein the pre-modulator comprises one of a transmissive modulator and a reflective modulator, and the primary modulator comprises one of a transmissive modulator and a reflective modulator.

10. The projector according to claim 1, wherein the pre-modulator and primary modulators are digital micromirror device (DMD) modulators or liquid crystal on silicon (LCoS) modulators.

11. The projector according to claim 1, wherein the pre-modulator is energized by compensated pre-modulator images comprising left and right images of a 3D image, and wherein the projector is part of a system for displaying an viewing 3D images comprising glasses comprising filters corresponding to the left and right images comprising filter passbands encompassing wavelengths of the left and right images.

12. The projector according to claim 11, wherein wavelengths of the left image originate from a laser light source illuminating a pre-modulator while being energized with a compensated pre-modulator left image corresponding the illuminating wavelengths in a left image time frame; wavelengths of the right image originate from a laser light source illuminating the pre-modulator while being energized with a compensated pre-modulator right image corresponding to the illuminating wavelengths in a right image time frame.

13. The projector according to claim 12, wherein the projector is part of a system for displaying and viewing 3D images and the modulated desired images are passed via wavelength selective filters in 3D viewing glasses such that modulated wavelengths of the left images of the 3D images are passed by a left filter of the 3D viewing glasses and modulated wavelengths of the right images of the 3D images are passed by a right filter of the 3D viewing glasses and the filters comprise passbands that are offset relative to the wavelengths being viewed through the passbands such that wavelengths of compensated half-tone images further modulated into desired left and right images by the primary modulator are passed via passbands that encompass and are shifted toward longer wavelengths compared to the wavelengths of the intended image wavelengths passed through the passbands.

* * * * *